United States Patent
Jeon

(10) Patent No.: US 11,897,392 B2
(45) Date of Patent: Feb. 13, 2024

(54) HAPTIC GENERATOR FOR PANELS OF VEHICLES AND INTERIOR PANEL FOR VEHICLES USING SAME

(71) Applicants: SEOYON E-HWA CO., LTD., Anyang (KR); SEOYON AMERICA CORPORATION, Auburn Hills, MI (US)

(72) Inventor: Jong Hwan Jeon, Anyang (KR)

( * ) Notice: Subject to any disclaimer, the term of this patent is extended or adjusted under 35 U.S.C. 154(b) by 0 days.

(21) Appl. No.: 18/046,899

(22) Filed: Oct. 14, 2022

(65) Prior Publication Data

US 2023/0133384 A1 May 4, 2023

(30) Foreign Application Priority Data

Oct. 29, 2021 (KR) ................. 10-2021-0146617

(51) Int. Cl.
*B60Q 9/00* (2006.01)
*B60K 35/00* (2006.01)
*B60R 13/02* (2006.01)
*B60R 16/03* (2006.01)
*G08B 6/00* (2006.01)

(52) U.S. Cl.
CPC ............... *B60Q 9/00* (2013.01); *B60K 35/00* (2013.01); *B60R 13/02* (2013.01); *B60R 16/03* (2013.01); *G08B 6/00* (2013.01); *B60K 2370/52* (2019.05); *B60K 2370/77* (2019.05); *B60R 2013/0287* (2013.01)

(58) Field of Classification Search
CPC ...... B60Q 9/00; B60K 35/00; B60K 2370/52; B60K 2370/77; B60K 2370/1438; B60K 2370/152; B60K 2370/158; B60K 2370/332; B60K 2370/84; B60K 37/06; B60R 13/02; B60R 16/03; B60R 2013/0287; B60R 16/023; G08B 6/00; G06F 3/016; G06F 3/0202; G06F 3/041; Y02B 20/40

See application file for complete search history.

(56) References Cited

U.S. PATENT DOCUMENTS

| | | | |
|---|---|---|---|
| 10,229,795 B2 * | 3/2019 | Fust | B60K 37/06 |
| 2002/0159834 A1 * | 10/2002 | Hamakawa | E01F 9/559 404/14 |
| 2019/0094568 A1 * | 3/2019 | Brown | G02C 3/003 |
| 2019/0179527 A1 * | 6/2019 | Channey | B60K 37/06 |

* cited by examiner

*Primary Examiner* — Omeed Alizada
(74) *Attorney, Agent, or Firm* — Harvest IP Law, LLP

(57) ABSTRACT

A haptic generator for panels of vehicles and an interior panel for vehicles using the same are proposed. The haptic generator includes a first coupling member with a first end integrally coupled to at a rear surface of a panel, a casing coupled to a second end of the first coupling member, a haptic actuator stored in the casing and configured to generate haptic vibration, a second coupling member with a first end integrally coupled to the rear surface of the panel, a support member coupled to a second end of the second coupling member, a touch sensor coupled to the rear surface of the panel with a predetermined distance from the support member, a PCB panel supported by the support member, and a display provided on a portion of a surface of the panel and configured to supply information about a switch.

16 Claims, 3 Drawing Sheets

HAPTIC GENERATOR FOR PANELS OF VEHICLES AND INTERIOR PANEL FOR VEHICLES USING SAME

CROSS REFERENCE TO RELATED APPLICATION

The present application claims priority to Korean Patent Application No. 10-2021-0146617, filed Oct. 29, 2021, the entire contents of which is incorporated herein for all purposes by this reference.

BACKGROUND OF THE INVENTION

The present disclosure relates to a haptic generator for panels of vehicles and an interior panel for vehicles using the same. More particularly, the haptic generator is configured to be installed directly to the interior panel to reduce manufacturing cost by reducing the number of parts, and to provide a visually harmonious interior of the vehicle to a user.

In general, haptic is a sense of touch provided to a user in the form of feedback force or vibration in a user interface of an electronic device. The haptic provides the user with various types of feedback through vibration. For example, if the user receives haptic vibration when touching a button on a screen, the user can make sure that the button is properly pressed.

This haptic technique may be applied to various devices such as mobile devices, touch screens, touch pads, levers, joysticks, etc., and may include an actuator generating a haptic effect.

Recently, a haptic generator is applied to a vehicle. For example, a front display is equipped with a touch screen with haptic feedback or various switches installed on an interior panel of the vehicle are operated based on the haptic generator to provide a user of vehicle a feedback about the switch operation.

FIGS. 1 and 2 are views showing an example of a conventional haptic generator for panels of vehicles. Conventionally, a space s is provided in the interior panel p for vehicles and a haptic generator h shown in FIG. 2 is installed in the space s.

The conventional haptic generator h may include a front cover 1 recognized as a switch by a user, a back cover 2, an actuator 3, an actuator casing 4, a touch sensor 5, a printed circuit board (PCB) 6, a light emitting diode (LED) 7, etc.

When the user touches the front cover 1, the touch sensor 5 detects the touch of the user and drives the actuator 3, and vibration generated by the actuator 3 is transferred along a structure to vibrate the front cover 1, and the process described above from detecting the touch by the user to transferring the vibration to the front cover is controlled by circuits of the PCB 6.

The conventional haptic generator has a large number of parts, which causes increased manufacturing cost and production time of the haptic generator.

Furthermore, the front cover 1 is installed in a top portion of the space s formed in the panel p. Therefore, the front cover 1 produced in different material and shape is separated from other portions of the panel p, which would make the interior of the vehicle discordant.

SUMMARY OF THE INVENTION

Accordingly, the present disclosure has been made keeping in mind the above problems occurring in the related art, and is intended to propose a haptic generator for panels of vehicles and an interior panel for vehicles including the same, wherein the haptic generator is configured to reduce the number of parts required for manufacturing the haptic generator to reduce the manufacturing time and provide a visually harmonious interior of the vehicle to a user.

In order to achieve the above objective, according to one aspect of the present disclosure, there is provided a haptic generator provided in a panel provided in a vehicle, the haptic generator including: a first coupling member of which a first end may be integrally coupled to the panel at a rear surface of the panel; a casing coupled to a second end of the first coupling member; a haptic actuator stored in the casing and configured to produce a vibration used for a haptic feedback; a second coupling member of which a first end may be integrally coupled to the panel at the rear surface of the panel; a support member coupled to a second end of the second coupling member; a touch sensor coupled to the rear surface of the panel while being spaced apart from the support member at a predetermined distance; a PCB panel supported by the support member; and a display provided on an outer surface of the panel and configured to supply information about a switch, wherein, when viewed from a front of the display, the display covers a portion the touch sensor is disposed on the rear surface of the panel.

The haptic generator may include a back cover coupled to the support member and defining a space storing the casing, the support member, the touch sensor, and the PCB panel.

The haptic generator may include a light emitting diode (LED) mounted to the PCB panel.

The haptic generator may include an illuminance sensor provided in the vehicle, wherein an activation and a deactivation of the LED may be determined in response to in-vehicle illuminance measured by the illuminance sensor. The display may be activated by turning on the LED when a touch signal from a user is detected by the touch sensor.

As a second form of the present disclosure, an interior panel for a vehicle may include a haptic generator described above.

According to the present disclosure, the haptic generator for panels of vehicles is configured to reduce the number of parts required to manufacture the haptic generator to reduce manufacturing time and configured to provide a visually harmonious interior of the vehicle to a user, and the interior panel for vehicles including the same can be proposed.

DETAILED DESCRIPTION OF THE INVENTION

Hereinbelow, a preferred embodiment of the present disclosure will be described with reference to accompanying drawings and detailed description for the embodiment of the present disclosure will be provided.

The terminology used herein is for the purpose of describing particular embodiments only and is not intended to be limiting the present disclosure. As used herein, the singular forms are intended to include the plural forms as well, unless the context clearly indicates otherwise. It will be further understood that the terms "comprises", "includes", or the like when used herein, specify the presence of stated features, integers, steps, operations, elements, components, or combinations thereof, but do not preclude the presence or addition of one or more other features, integers, steps, operations, elements, components, or combinations thereof.

Figure 1:
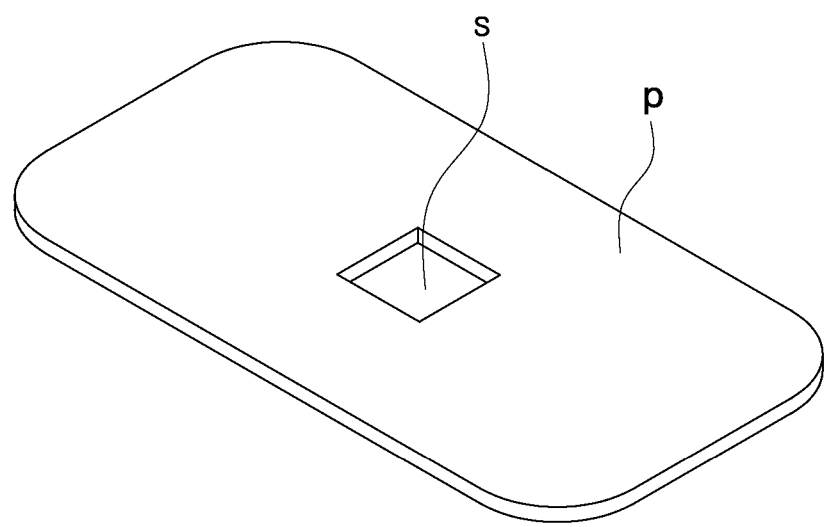
FIGS. 1 and 2 are views showing an example of a conventional haptic generator for panels of vehicles.
Figure 2:
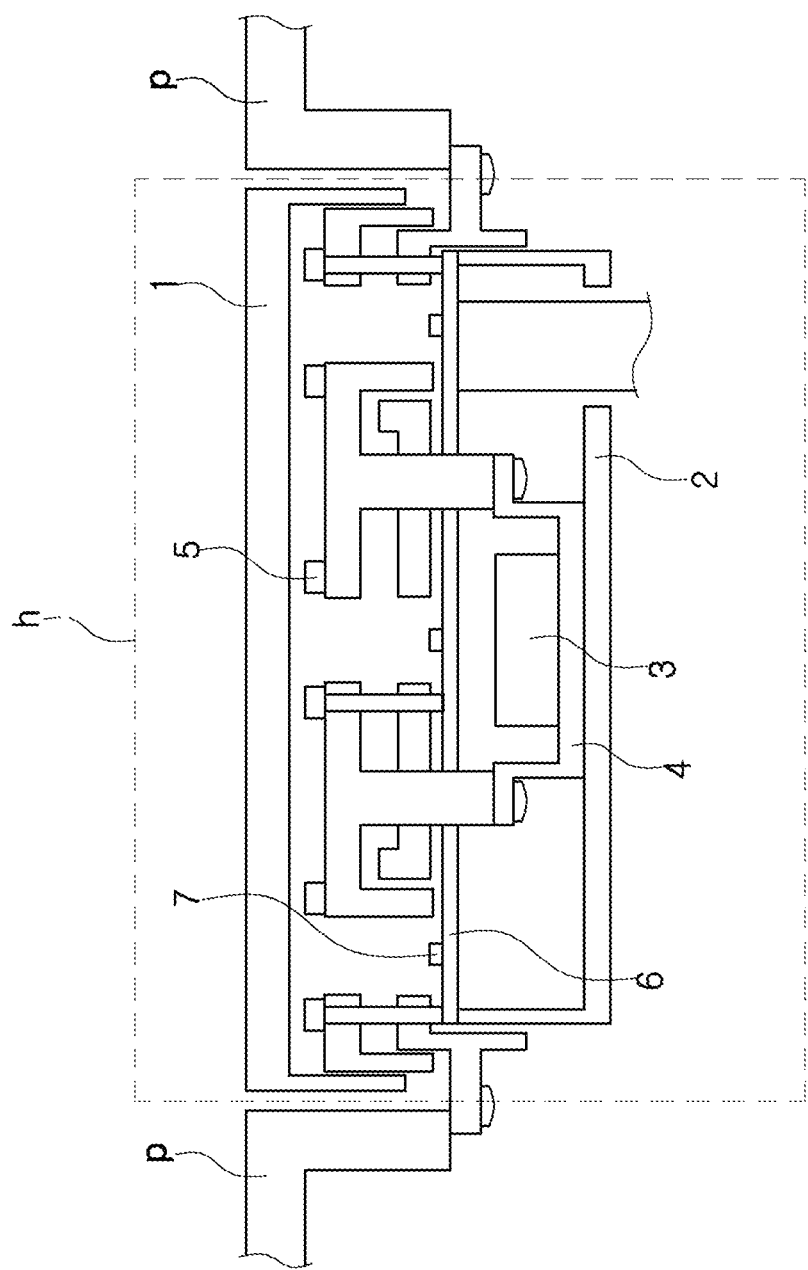
Figure 3:
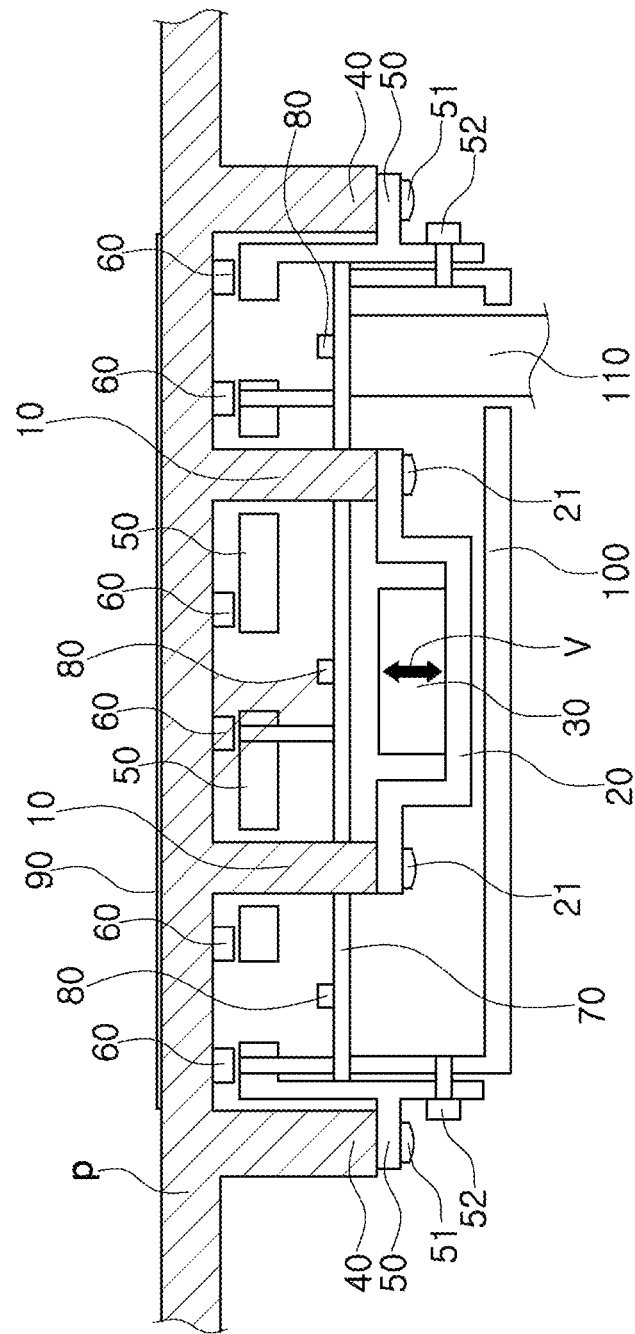
FIG. 3 is a view showing a haptic generator for panels of vehicles and an interior panel for vehicles using the same according to an embodiment of the present disclosure.

FIG. 3 is a view showing a haptic generator for panels of vehicles and an interior panel for vehicles using the same according to an embodiment of the present disclosure.

The present disclosure provides a haptic generator for panels of vehicles as an exemplary embodiment and an interior panel for vehicles as another exemplary embodiment. The interior panel for vehicles relates to a panel adopting the haptic generator for panels of vehicles. Therefore, the haptic generator for panels of vehicles will be described in detail and the interior panel for vehicles will be described briefly.

Hereinbelow, the haptic generator for panels of vehicles according to one embodiment will be described with reference to FIG. 3.

According to the embodiment, the haptic generator for panels of vehicles is installed to an interior panel of a vehicle to provide a user with haptic feedback. The interior panel of a vehicle is a panel installed in a vehicle, and when decorative elements are added to a panel, the panel may be called a vehicle interior garnish. According to the embodiment, since the interior panel is manufactured with the use for decorative elements in mind, the panel may be called a vehicle interior garnish, but in order to be consistent with terminology, the panel will be called the interior panel.

According to the embodiment, the haptic generator for panels of vehicles includes: a first coupling member 10, a casing 20, a haptic actuator 30, a second coupling member 40, a support member 50, a touch sensor 60, a printed circuit board (PCB) panel 70, a LED 80, a display 90, and a back cover 100.

The first coupling member 10 has a rod shape of which a first end is coupled to a rear surface of the panel P. The first coupling member 10 is integrally coupled to the rear surface of the panel P. For example, the panel P and the first coupling member 10 may be a single piece unit manufactured with an injection modeling process.

The casing 20 is coupled to a second end of the first coupling member 10 by a casing bolt 21 and provides a gutter-shaped space.

The haptic actuator 30 is stored in the casing 20 and generates a haptic vibration.

According to the embodiment, the haptic actuator 30 generates the vibration in a vertical direction V as shown in FIG. 3, and uses a waveform in the frequency band of 100~200 Hz that the human body detects most sensitively. More preferably, the haptic actuator 30 uses 120 Hz frequency that may provide a long and soft haptic effect to the user or 175 Hz frequency that may provide a short and concise haptic effect.

The second coupling member 40 has a rod shape of which a first end is coupled to the rear surface of the panel P, and as described in the first coupling member 10, the second coupling member 40 is integrally coupled to the rear surface of the panel P.

The support member 50 is coupled to a second end of the second coupling member 40 by a first coupling means 51 and may support the touch sensor 60, the PCB panel 70, the back cover 100, etc. The support member 50 may be coupled to the back cover 100 by a second coupling means 52. The first coupling means 51 and the second coupling means 52 may be a bolt, screw, pin and the like, or be a hook-shaped coupling means. A proper coupling means should be selected based on a manufactory condition or manufacturing cost.

The touch sensor 60 may be coupled to the rear surface of the panel P while being spaced apart from the support member 50 at a predetermined distance. The touch sensor 60 may be implemented as various types of sensors such as a capacitive type, a resistive type, or an electromagnetic type. The capacitive touch type is preferred because it can be used for variety of input devices and has a high resolution.

The PCB panel 70 is a circuit board supported by the support member 50. Various circuits controlling the haptic generator for panels of vehicles are included in the PCB panel 70.

The LED 80 is coupled to the PCB panel 70 and, when necessary, the LED 80 provides lighting for the display 90.

An illuminance sensor (not shown) is provided in the vehicle to measure illuminance, and the LED 80 may be turned on only at a level of illuminance below a predetermined level and the LED 80 may be turned off at a level of illuminance above the predetermined level, and regardless of a level of illuminance, the LED 80 may be turned on while using the vehicle.

Furthermore, when a touch signal from the user is detected by the touch sensor 60, the LED 80 is turned on and the display 90 is activated. Activating the display 90 means that the touch sensor 60 is ready to receive an operation signal. In other words, when the touch signal from the user is received by the touch sensor 60 while the display 90 is deactivated because no signal is received by the touch sensor 60 for a long time, the LED 80 is turned on to notify the user of activation of the display 90, and then when the touch signal from the user is detected by the touch sensor, the haptic actuator 30 is operated to perform the operation desired by the user.

The PCB panel 70 is connected to another circuit by a connector 110 and is supplied with power. The connector 110 may pass through the back cover 100.

The display 90 is disposed on an outer surface of the panel P to provide information about a switch, wherein the outer surface may face inside of the vehicle. The display 90 may cover, when viewed from a front of the display 90, a portion that the touch sensor 60 is disposed on the rear surface of the panel P as shown in FIG. 3. Pictures or text may be displayed to notify the user of the information about operation of the switch. In either way, the display shows the location of the switch.

The back cover 100 may be coupled to the support member 50 by the second coupling means 52. Overall, the back cover 100 may form a space, together with the panel P and the support member 70, to store the casing 20, the haptic actuator 30, the touch sensor 60, the PCB panel 70, etc.

An operation process of the switch according to the embodiment described above will be described as follow.

When the user looks at the display 90, confirms the location of the switch, and touches the display 90 with a finger, etc., the touch sensor 60 detects the touch of the user, and the display 90 is activated. When the display 90 is activated, the LED 80 makes a color of the display 90 different from another color of the display 90 when the display 90 is deactivated, and in this state, when the user touches the touch sensor 60, the haptic actuator 30 generates the haptic vibration and the vibration is transmitted to the user. Then, an operation desired by the user occurs. The haptic vibration generated by the haptic actuator 30 is transmitted to the surface of the panel P through the casing 20 and the first coupling member 10. The user receives the vibration generated on the display 90 as feedback of the touch of the user.

The haptic generator of the embodiment has fewer parts than the conventional haptic generator so that the manufacturing costs can be reduced. A small number of parts can shorten manufacturing process time, and the reduction in the manufacturing process time leads to improved productivity.

Furthermore, a quick transmission of the feedback to the user can be expected due to a short transfer path of the vibration. In addition, the vibration generated by the haptic actuator 30 is transferred to the entire panel P, which enables elimination of a separate suspension means for damping the vibration because the damping of the vibration occurs effectively by the panel P.

Meanwhile, as the display 90 is provided directly on the surface of the panel P without forming a space in the panel P and without using separate top cover for a switch, a harmonious decorative feel can be provided in the vehicle.

The second embodiment of the present disclosure is an interior panel including the above-described haptic generator for vehicles. The interior panel for vehicles is a term that refers to all types of panels installed inside a vehicle. When a panel is installed in a vehicle, regardless of whether the installation location is a door, a dashboard, a ceiling, etc., the panel may refer to as the interior panel for vehicles.

Because the interior panel for vehicles is characterized by the above-described haptic generator, and the application of the haptic generator to the interior panel for vehicles has been described, an additional description of the interior panel for vehicles will be omitted.

Hereinabove, although detailed description is provided to implement the haptic generator for panels of vehicles and the interior panel of a vehicle using the same according to the preferred embodiments of the present disclosure, the scope and sprit of the present disclosure is not limited to the above described embodiments, and the present disclosure may be materialized into the variously-shaped haptic generator for panels of vehicles and the interior panel of a vehicle using the same without departing from the scope and sprit of the present disclosure.

What is claimed is:

1. A haptic generator provided inside a vehicle, the haptic generator comprising:
    a panel comprising a front surface facing a forward direction and a rear surface facing a rearward direction opposite to the forward direction
    a first coupling member whose first end is integrally coupled to the rear surface of the panel;
    a casing coupled to a second end of the first coupling member;
    a haptic actuator stored in the casing and configured to produce a vibration used for a haptic feedback;
    a second coupling member whose first end is integrally coupled to the rear surface of the panel;
    a support member comprising a forward support member portion extending substantially parallel to the panel and positioned at a rear of the panel, a side support member portion extending toward the rearward direction from the forward support member portion, and a coupling support member portion protruding from the side support member portion toward the second coupling member;
    a touch sensor coupled to the rear surface of the panel while being spaced apart from the forward support member portion at a predetermined distance;
    a printed circuit board (PCB) panel; and
    a display provided on the front surface of the panel, and configured to provide information about a switch, wherein, when viewed from a front of the display, the display covers a portion the touch sensor is disposed on the rear surface of the panel,
    wherein the forward support member portion has a first hole through which the first coupling member passes, the side support member portion is configured to support the PCB panel, and the coupling support member portion is configured to be coupled to a second end of the second coupling member.

2. The haptic generator of claim 1, further comprising:
    a back cover coupled to the side support member portion to form a space storing the casing, the support member, the touch sensor, and the PCB panel.

3. The haptic generator of claim 2, further comprising:
    a light emitting diode (LED) mounted to the PCB panel.

4. The haptic generator of claim 3, further comprising:
    an illuminance sensor provided in the vehicle, wherein an activation and a deactivation of the LED is determined in response to an in-vehicle illuminance measured by the illuminance sensor.

5. The haptic generator of claim 3, wherein the display is activated by turning on the LED when a touch signal from a user is detected by the touch sensor.

6. The haptic generator of claim 1, further comprising:
    a light emitting diode (LED) mounted to the PCB panel.

7. The haptic generator of claim 6, further comprising:
    an illuminance sensor provided in the vehicle, wherein an activation and a deactivation of the LED is determined in response to an in-vehicle illuminance measured by the illuminance sensor.

8. The haptic generator of claim 6, wherein the display is activated by turning on the LED when a touch signal from a user is detected by the touch sensor.

9. An interior panel for a vehicle, the interior panel comprising:
    the haptic generator described in claim 1.

10. The interior panel of claim 9, further comprising:
    a back cover coupled to the side support member portion to form a space storing the casing, the support member, the touch sensor, and the PCB panel.

11. The interior panel of claim 10, further comprising:
    a light emitting diode (LED) mounted to the PCB panel.

12. The interior panel of claim 11, further comprising:
    an illuminance sensor provided in the vehicle, wherein an activation and a deactivation of the LED is determined in response to an in-vehicle illuminance measured by the illuminance sensor.

13. The interior panel of claim 11, wherein the display is activated by turning on the LED when a touch signal from a user is detected by the touch sensor.

14. The interior panel of claim 9, further comprising:
    a light emitting diode (LED) mounted to the PCB panel.

15. The interior panel of claim 14, further comprising:
    an illuminance sensor provided in the vehicle, wherein an activation and a deactivation of the LED is determined in response to an in-vehicle illuminance measured by the illuminance sensor.

16. The interior panel of claim 14, wherein the display is activated by turning on the LED when a touch signal from a user is detected by the touch sensor.

* * * * *